No. 608,743. Patented Aug. 9, 1898.
C. D. WRIGHT.
NUT LOCK.
(Application filed Oct. 28, 1897.)
(No Model.)
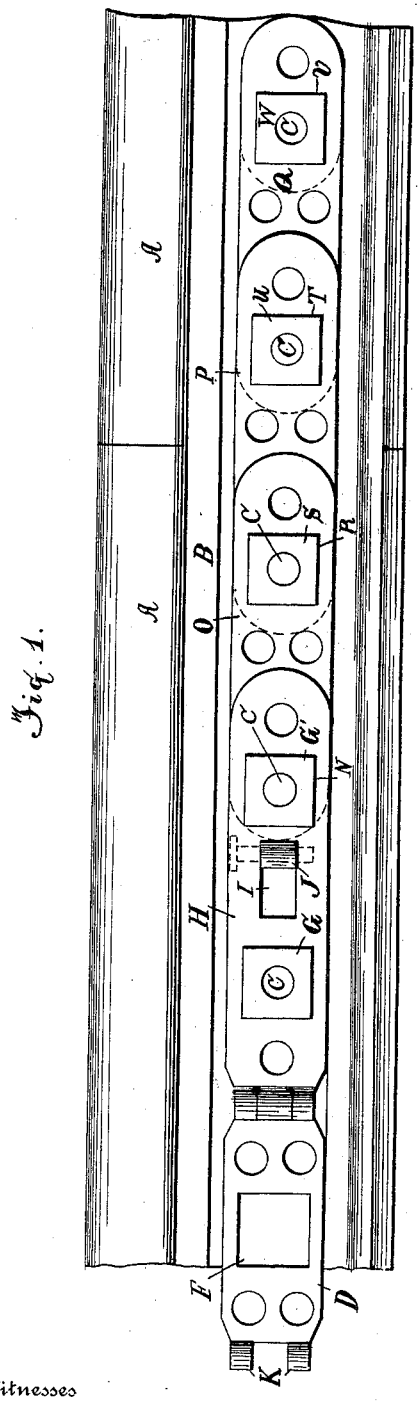
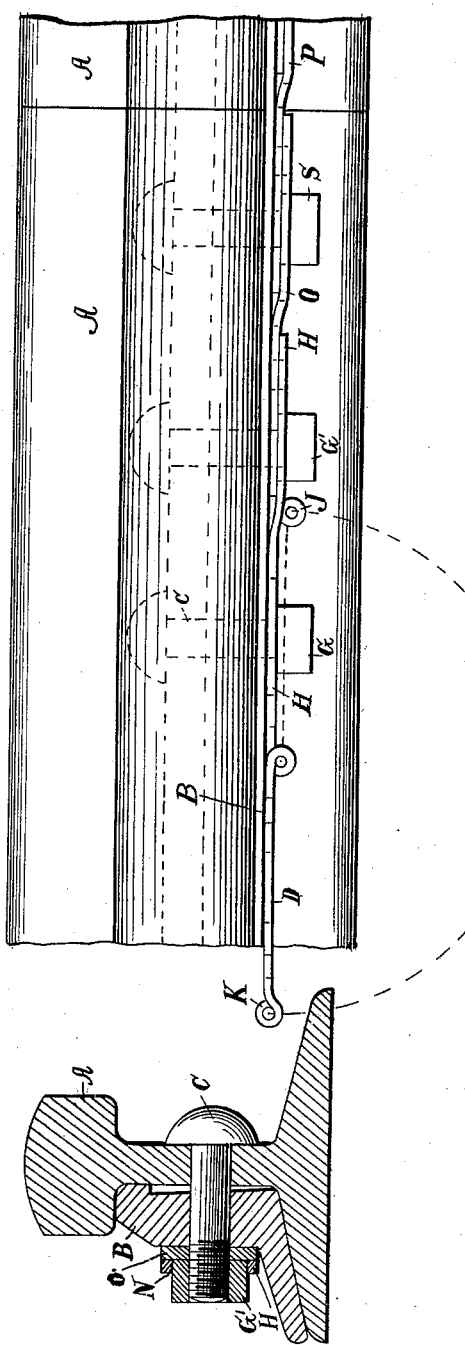
Witnesses
O. Seiffert
Harry Pagle.
Inventor
Charles D. Wright
By George Oetsch
Attorney
THE NORRIS PETERS CO., PHOTO-LITHO., WASHINGTON, D. C.

UNITED STATES PATENT OFFICE.

CHARLES D. WRIGHT, OF NILES, MICHIGAN.

NUT-LOCK.

SPECIFICATION forming part of Letters Patent No. 608,743, dated August 9, 1898.

Application filed October 28, 1897. Serial No. 656,670. (No model.)

*To all whom it may concern:*

Be it known that I, CHARLES D. WRIGHT, a citizen of the United States, residing at Niles, in the county of Berrien and State of Michigan, have invented certain new and useful Improvements in Nut-Locks; and I do hereby declare the following to be a full, clear, and exact description of the invention, such as will enable others skilled in the art to which it appertains to make and use the same.

My invention relates to an improvement in nut-locks; and it consists in a series of overlapping plates having openings through them, so as to catch over the nuts upon the bolts, and which plates are connected together from one end to the other, as will be more fully described hereinafter.

The object of my invention is to produce a separate locking-plate for each one of the nuts, and yet to connect these plates together so that they can be removed only by beginning at one end.

In the accompanying drawings, Figure 1 is a side elevation of a nut-lock which embodies my invention. Fig. 2 is a vertical section of the same, taken through one of the nuts. Fig. 3 is a plan view of a portion of the nut-lock.

A represents the two rails, and B the fish-plate, which are secured together by the bolts C in the usual manner.

D represents one of the plates which form the nut-lock and which has a square opening F made therethrough, so as to catch over the nut G, as shown in dotted lines in Fig. 3. The inner end of this plate D is formed, as shown, so as to connect like a hinge with the plate H, which has a slot I formed in it, and the metal from this slot is turned or rolled backward, as shown at J, so as to form a portion of the lock, which connects with the outer end of the plate D. When the plate D is placed in position, it extends along the rail, as shown in Fig. 1; but after the nut-lock has been formed it is closed over the plate H, as shown in Fig. 3, so as to form a lock for the nut G, and a pin or rivet is then passed down through the parts J and K, which form a means for locking this plate D in position. The plate H is also provided with a square hole N, which catches over the nut G, and the plate H is bent outwardly just beyond the nut, so as to allow the end of the next plate O to pass under it sufficiently far to allow one of the bolts C to pass both through it and the end of the plate H. This plate O in turn is bent outwardly, as shown in Fig. 3, just beyond the end of the plate H, so as to allow the next succeeding plate P to have its end passed under it, and then the end of the bolt passes through the ends of both the plates O and P. The plate O is provided with a square opening R to catch over the nut S upon the bolt which passes through it, and the nut is thus prevented from turning. The plate P is in turn bent outwardly just beyond the end of the plate O, so as to allow the end of the plate Q to be passed back of it, and through the ends of the plates P and Q one of the bolts C passes, and the plate P is provided with a square opening T to catch over the nut U. The plate Q, being the last one of the series, is perfectly straight and bears against the outer side of the fish-plate. This plate is provided with a square hole V, so as to catch over the nut W upon one of the bolts C, which secures the outer end of the plate in position. Any desired number of these plates may be used, each one being made to overlap the end of the next adjoining one, and thus one plate is made to lock the next succeeding one in position. In order to remove the plates which form this nut-lock, one must begin with the plate D and remove them one at a time in regular succession.

Having thus described my invention, I claim—

A nut-lock composed of a series of overlapping plates, the end of each succeeding plate being made to catch behind the end of the preceding one; the bolts, and the nuts placed upon the bolts, combined with the plate D which is hinged to the end plate of the series, and which plate is adapted to close over the nut upon the bolt which passes through the next succeeding plate, and which plate has its free end adapted to be locked in position after the plates which form the nut-lock have been secured in position, substantially as set forth.

In testimony whereof I affix my signature in presence of two witnesses.

CHARLES D. WRIGHT.

Witnesses:
 GEO. G. FELDMAN,
 HARRY PAGLE.